United States Patent [19]

Backlund

[11] 4,305,681

[45] Dec. 15, 1981

[54] METHOD AND APPARATUS FOR CONTROLLING THE TEMPERATURES OF ASPHALT BODIES AND CONCRETE BODIES

[76] Inventor: Lennart Backlund, Tormodsvägen 15, S-832 00 Frösön, Sweden

[21] Appl. No.: 96,524

[22] Filed: Nov. 21, 1979

[30] Foreign Application Priority Data

Nov. 22, 1978 [SE] Sweden ............................. 7812026

[51] Int. Cl.³ ............................................ E01C 11/26
[52] U.S. Cl. ................................. 404/95; 404/77; 404/79; 404/71; 165/45; 165/47; 405/131
[58] Field of Search ....................... 404/79, 95, 17, 77, 404/27, 71; 165/45, 1, 47; 405/130, 131

[56] References Cited

U.S. PATENT DOCUMENTS

| | | | |
|---|---|---|---|
| 3,057,270 | 10/1962 | Lee | 404/17 X |
| 3,195,619 | 7/1965 | Tippmann | 404/79 X |
| 3,777,502 | 12/1973 | Michie | 165/45 X |
| 3,804,543 | 4/1974 | Best | 404/28 |
| 3,847,208 | 11/1974 | Ollendorf | 165/1 |
| 3,968,347 | 7/1976 | Cooksley | 165/1 X |
| 4,036,285 | 7/1977 | Best | 165/45 |
| 4,162,394 | 7/1979 | Faccini | 165/45 X |
| 4,220,202 | 9/1980 | Alediev | 165/45 X |

*Primary Examiner*—Nile C. Byers, Jr.
*Attorney, Agent, or Firm*—James E. Nilles

[57] ABSTRACT

A method and an apparatus for controlling the temperature of asphalt and concrete bodies (1) in connection to storing of heat in the ground or in rocks, whereby channels (3) are drilled into the ground or the rock at or underneath the asphalt or concrete body the temperature of which is to be controlled, and in the said drilled channels (3) are inserted adaptor elements comprising two or more inner tubes or channels (6; 17) for supply and removal of a heat transport medium. The inner tubes (6; 17) in the adaptor elements are preferably formed so as to open on different levels of the channel (3) and also preferably the adaptor element is formed with cross partition walls (13) providing severaL zones distributed along the channel whereby heat can be transported between the zones and between a particular zone and the body the temperature of which is to be controlled.

11 Claims, 11 Drawing Figures

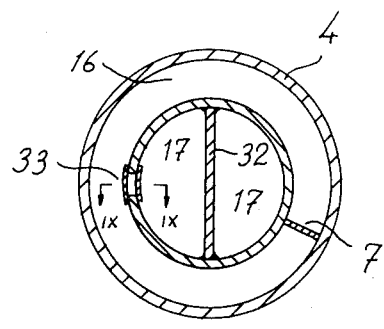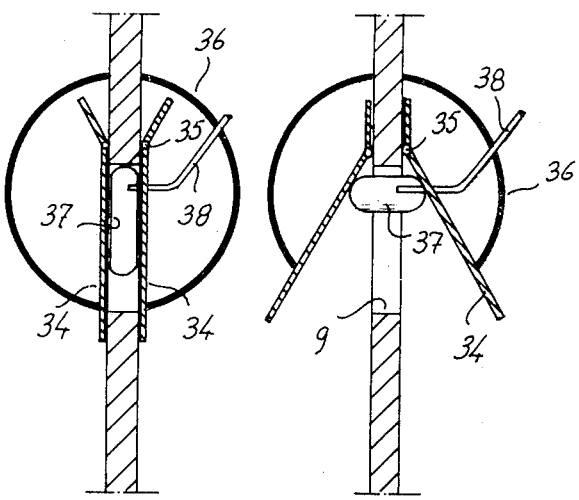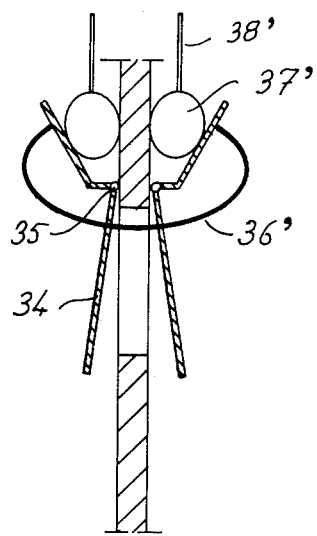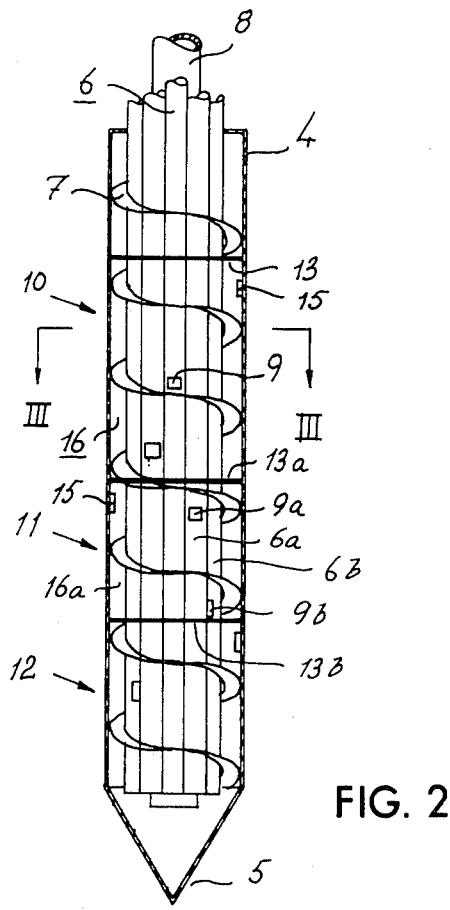
FIG. 8
FIG. 9
FIG. 10
FIG. 11
FIG. 2

METHOD AND APPARATUS FOR CONTROLLING THE TEMPERATURES OF ASPHALT BODIES AND CONCRETE BODIES

The present invention relates to a method and an apparatus for controlling the temperature of asphalt and concrete bodies like road and street coverings, landing strips for aeroplanes, bottom floors for house bodies, walls and roofs etc for houses.

The basic problem of the invention was to provide a system for storing heat energy and to later use such stored energy in order to give the asphalt or concrete body a suitable temperature, for instance in order to eliminate large temperature differences between different mediums thereby preventing slipperyness depending on ice or snow on the landing strips, roads, pavements, at road crosses etc, or in order to prevent frost damages and cracking, or in order to prevent heavy temperature drops in different parts of a house etc. The system is based on the method known per se to utilize available heat energy, for instance sun energy, waste heat from different types of heating equipments, heat from lakes and watercourses etc and to transmit such heat to a medium having a lower temperature thereby storing the collected heat in the said medium.

Attempts have previously been made to solve the said problem in digging heat accumulators into the ground and to collect heat therein during heat periods and later make use of said heat during subsequent cold periods. Such systems are expensive and complicated and can normally not be used in rocks and under present buildings, roads, streets etc. Attempts have also been made to solve the problem by storing energy in lakes and watercourses, but also such methods are expensive and complicated, there are great demands on the equipment for executing the method and it gives a relatively little effect since normally a remarkably low temperature difference is obtained between the medium to be heated and the temperature of the lake or the watercourse.

The object of the invention therefore is to provide a method and an apparatus for storing heat energy in the ground, in the bedrock etc for later utilizing the said stored energy for controlling the temperature of asphalt and concrete bodies, which method and apparatus is simple and relatively cheap to manufacture and use, which can be utilized practically anywhere without special consideration to the nature of the ground and the bedrock, which can be applied underneath present streets, roads, landing strips, houses and many other objects and which is very flexible and can be used for controlling the temperature within wide ranges.

According to the invention bores are drilled obliquely down into the ground, the bedrock etc and in the said adapter elements are pushed down which elements are formed with channels for a heat transport medium and the collected heat is transported through the said channels of the adapter elements to provide a heating of the ground, the bedrock etc around the adapter element. The heat energy thereby stored can later be re-transmitted to the asphalt or concrete body to be heated by means of the same heat transport medium. In many cases it may be suitable to make use of the very asphalt or concrete body for collecting some energy and to provide a reversible heat transport system between the element for collecting the heat of the asphalt and the concrete body on one hand and the adapter elements in the ground or the bedrock on the other hand.

Further characteristics of the invention will be evident from the following detailed specification in which reference will be made to the accompanying drawings.

In the drawings

FIG. 1 diagramatically illustrates the method and the apparatus, according to the invention in a simple system for tempering an asphalt or concrete strip.

FIG. 2 is a partial cross section through an adaptor element to be inserted in the bores drilled in the ground.

Figure 5:
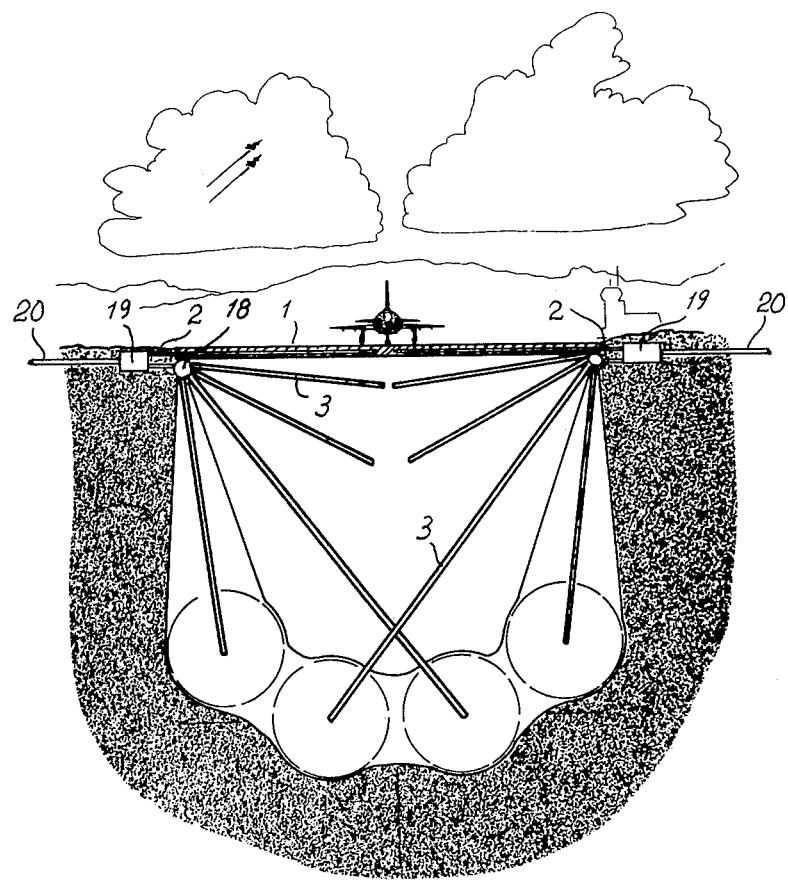

FIG. 5 diagramatically illustrates a modified embodiment of a system according to the invention having several heat transmitting elements inserted in drilled bores under a landing strip of asphalt or concrete.

Figure 6:
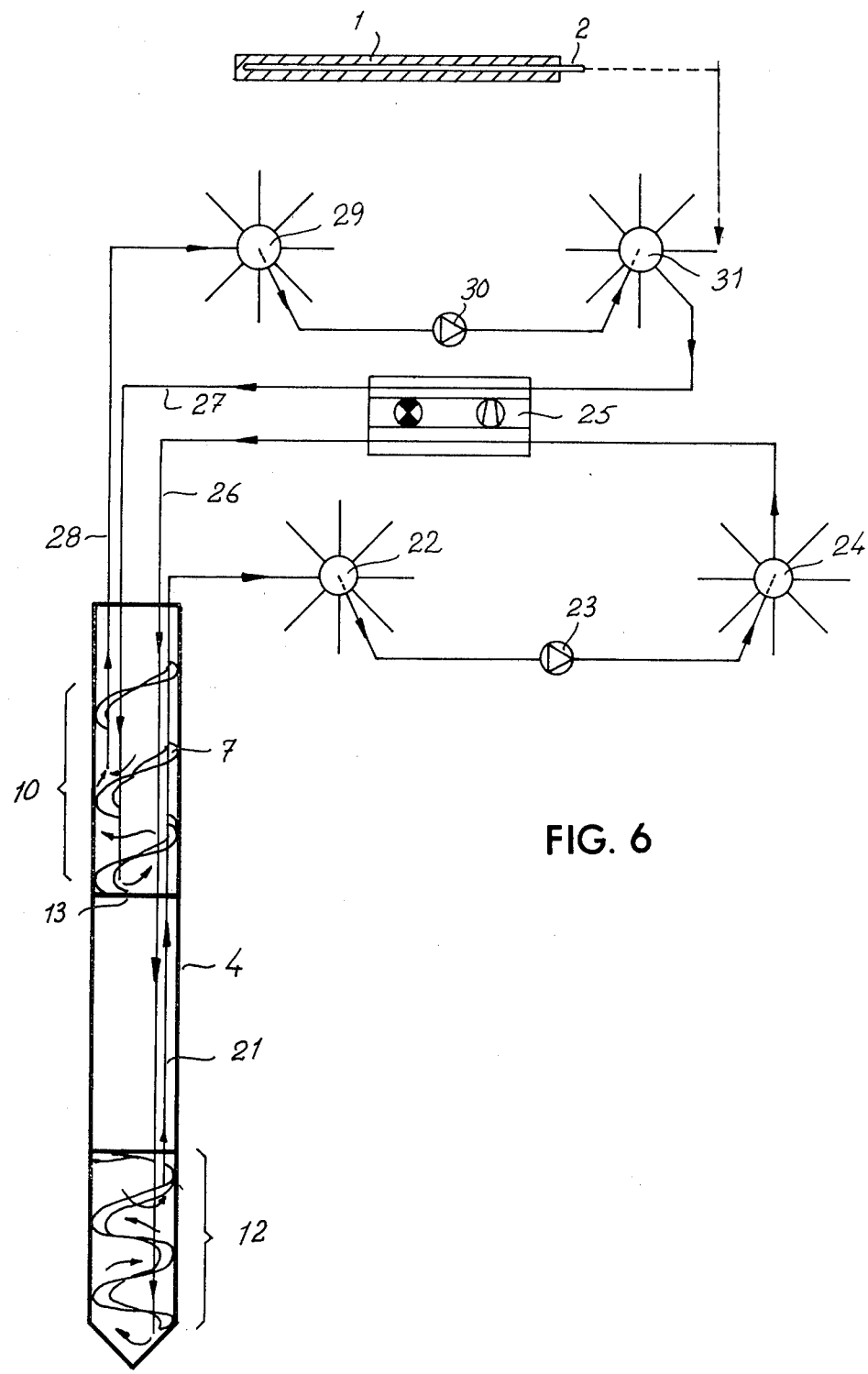

FIG. 6 diagramatically illustrates an application of use in which the elements according to the invention are used for storing energy in one zone and concurrently therewith collecting energy from another zone.

Figure 7:
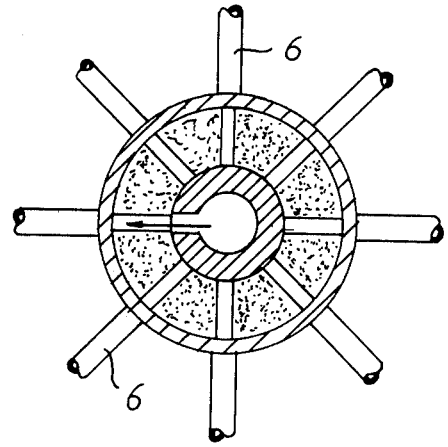

FIG. 7 shows a valve of a type which is diagramatically illustrated in FIG. 6.

FIG. 8 shows a cross section through a simple embodiment of a heat storing element having only two channels.

FIG. 9 shows a valve system for the apparatus of FIG. 8 seen along line IX—IX with the valve in its down or closed position, and FIG. 10 correspondingly shows the valve in its open position.

FIG. 11 shows like in FIGS. 9 and 10 a slightly modified embodiment of the valve.

Figure 1:
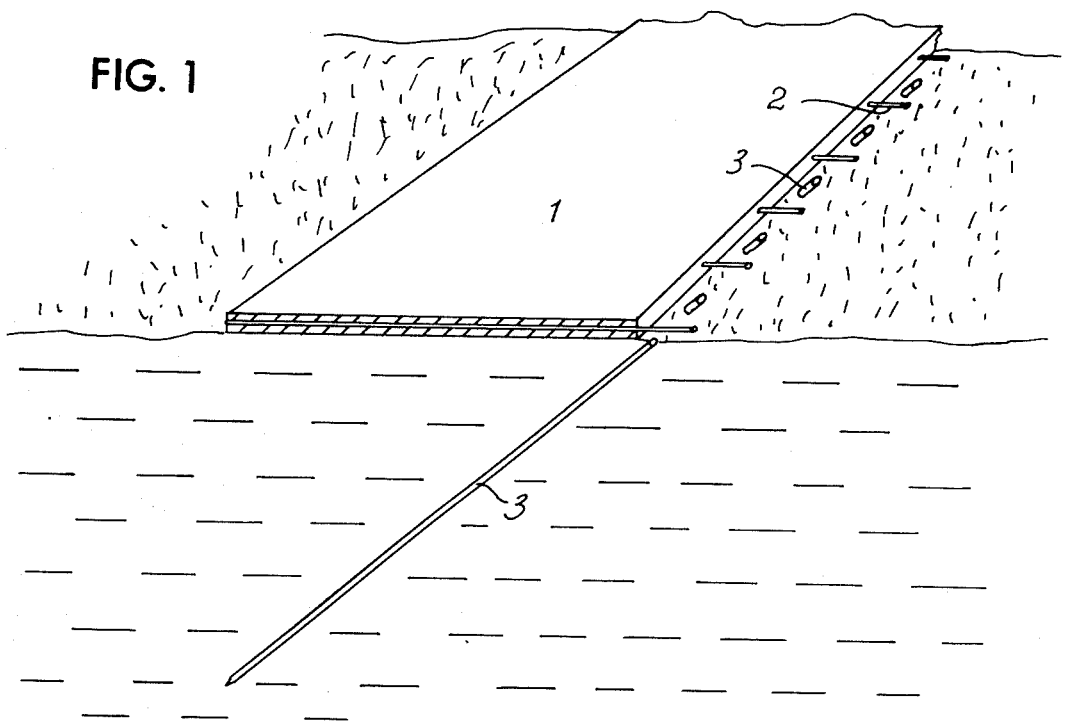

Referring to FIG. 1 there is shown a simple system for tempering an asphalt or concrete body 1 which may be a road, a pavement, a landing strip for an aeroplane, a concrete bottom on which a house is built or any other means. The intention of the invention is to store energy in the ground adjacent or under the body 1. This is provided by collecting heat energy in any suitable way and accumulating the energy for later use. The heat energy may be excess energy from heating plants, sun heat energy, heat from cooling water of machines, heat from de-air equipments like air-condition equipments, low cost electric energy received during low-consumption-periods etc. In the exemplified embodiment illustrated in FIG. 1 it is presupposed that some part of the energy is collected as sun energy directly into the body 1, and for this purpose conduits 2 are casted or in any way provided in the body or the strip 1. The conduits 2 are connected to a common main conduit (not shown) which over a heat exchanger, a heat pump or any other suitable means is connected to a system for accumulating heat in the ground or in the rock. Of course the heat can be received from several different mediums or heating plants at the same time and it can be stored in one and the same ground accumulator system.

For storing the heat in the ground there is used a system of heat channels 3 provided in the ground or in the rock at or underneath the asphalt or concrete strip 1. The heat channels are provided by drilling bores in the ground or in the rock, and in said bores adaptor elements are introduced having a channel system for transporting the collected heat by means of a heat transferring medium and to give off the heat at a suitable place in the ground or the rock. The heat channels 3 of FIG. 1 consequently are drilled down into the ground extending parallelly to each other from one side of the strip or path obliquely down under the strip so that the channels cover an area substantially vertically down under the strip 1. Thereby a system of heating zones are obtained underneath the strip at the same time as the strip itself provides an insulating medium in the direction upwards for the energy stored in the ground or the rock. The heat channels 3 may be provided in any suitable distance from each other, but in a specific embodiment the channels are drilled at about five meters distance from each other. Depending on the width of the strip and the angle of the heat channels to the horizontal plane the heat channels may have different length, but generally the channels should have such length as to substantially cover the surface vertically down under the strip. The heat channels 3 are connected to the pump or the other medium receiving the heat from the sun heating conduits 2 and the heat received thereby consequently can be stored in the ground underneath the strip 1 transmitted by the heat channels 3. Thereby frost damages, frostlifts etc are prevented in that the stored heat, at least under certain conditions, re-transmits heat to the strip keeping same free from frost and ice. Preferably, however, the system is provided reversible so that the heat stored in the ground can upon need be taken out and transmitted to the strip 1 what is made in that the heat transport medium is pumped from the heat channels 3 into the heat conduits 2 in the strip 1.

One example of the adaptor provided in the drilled heat channels is shown in FIG. 2. If the heat channels 3 are drilled in rock there is no need for an outer casing for the adaptor, but if the bores are drilled in earth or any loose material it can be formed with a casing thereby providing an integral sealed unit.

Thus the adaptor shown in FIG. 2 comprises a sleeve 4 which is closed at the bottom and which is preferably formed with a bottom tip 5, and it may likewise be closed at the top or it may be connected to an expansion chamber. In the sleeve 4 several heat transport tubes or hoses 6 are mounted. Each tube is closed at the bottom and extends up through the top of the sleeve 4. The tubes are kept together by an outer spiral strip 7 which sealingly engages the inner periphery of the sleeve 4. In case the heat channel 3 is drilled in rock there is no need for an outer sleeve, and in such case the spiral strip 7 seals directly to the walls of the channel. In order to keep the tubes 6 to the inner edge of the spiral strip 7 they are preferably mounted round a core 8 which can in special cases be used as a return channel for the heat transfer medium. The core 8 is a tube or a hose which is open at the bottom and which likewise extends through the top of the sleeve 4. Each heat transport tube 6 is at a place specially chosen along the height thereof formed with an opening, for instance the opening 9 for letting out heat transport medium and receiving heat transport medium respectively. The openings 9 of the different tubes are distributed along the height of the inserted elements so as to be distributed corresponding to a number of wanted different heat zones. In the shown example the inserted adaptor element is formed with three heat zones, viz. an upper zone 10, and intermediate heat zone 11 and a bottom heat zone 12. The different temperature heat zones 10, 11 and 12 are shielded from each other by sealing partition walls 13 through which the tubes 6 and the core 8 extend. For providing a seal between the different zones also a sealing mass 14 can be provided between the tubes 6 and to the core 8.

The heat transport tubes 6 are separately connected to the means for receiving and distributing the heat, and the said means comprises one or more distribution valves by means of which the heat transport medium can be supplied to one or more of the different tubes 6 for transmitting heat to one or more zones or for taking off heat from such zones or for distributing heat between the different zones.

For each zone there is preferably a temperature sensor 15 by means of which the temperature at the sleeve and thereby in the ground adjacent the sleeve can be measured. The temperature sensors 15 are each connected to a (non-shown) control unit from which the distribution to and from different heat zones can be controlled.

The openings 9 of the tubes 6 are provided radially outwards and open in the spirally formed channel 16 or spiral channel provided between the tubes and the walls of the outer casing or the channel respectively, and water or any other transport medium pumped out in the spiral channel 16 from an opening 9 is thereby forced to follow the spiral formation of the channel 16 to another opening in which the water or the other transport medium is received and fed back.

Figure 4:
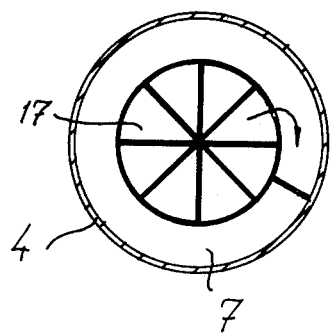

In FIG. 4 an alternative embodiment of the adaptor or insert element is shown. In this case the space inside the spiral strip 7 is filled with a unit comprising a number of sector formed channels 17 which are in direct contact with each other and which support each other. In this case there is no need for a core.

In FIG. 5 is diagramatically shown a more developed embodiment than the above described system. In the latter case four heat channels having inserted adaptor elements are drilled at different angles to each other underneath the landing strip 1, and by means of the said four channels four different vertical heat zones are provided. By forming the adaptor elements with sealing partition walls as described above each heat channel 3 can additionally be formed so that the heat is distributed in several different horizontal zones, whereby the heat is directed exactly to the place where the heat is actually needed. By dividing the system in both vertical and horizontal zones it is possible to add and subtract respectively heat very carefully to an exact amount actually suited for the area. In FIG. 5 is only diagramatically shown that all heat channels 3 over a collector tube 18 are connected to each other and are connected to a control unit 19 which may include means for supply of electricity, circulation pumps, heat pumps, distribution means, heat exchangers etc. To the said control unit 19 also the sun heating conduits 2 are connected. Also a conduit 20 is connected to the control unit which conduit 20 is supposed to add heat from a supplementary or alternative source of heat like from sea-water, a heat-central, a sun-collector or a similar means.

During hot or sunny days the asphalt or concrete body 1 receives heat, and the said heat is distributed in the conduits 2 and is supplied to the control unit 19. By reading the temperature sensors 15 information is obtained about the temperature of the different zones, and on basis thereof the apparatus is controlled so that water heated over the conduits 2 are supplied just to the zone having a need for heat. If it is considered that for instance the zone 11 should need an addition of heat the hot medium from the conduits 2 are supplied thereto over the conduits 6a, and the hot medium is pumped out through the opening 9a thereof which opens adjacent the upper partition wall of said zone. The heated water flows through the channel 16a thereby giving off heat to the sleeve 4 or to the walls of the channel respectively. The return of the water is made by another tube, for instance the tube 6b, the opening 9b of which is located adjacent the lower partition wall 13b of the zone 11.

It is also possible to supply the heated medium to several zones at the same time or to add heat to one zone at the same time as heat is taken out from another zone.

Supposing heat is to taken out from zone 12 and is supplied to zone 10. This is made by two different transport systems and an intermediate heat pump or heat exchanger. Heated water is by the conduit 21 (FIG. 6) at the upper end of zone 12, and the heated water is over a first distribution valve 22, a pump 23 and a second distribution valve 24 supplied to a heat pump or heat exchanger 25 to which the heat is emitted. The cooled water is returned by a tube 26 opening at the bottom of zone 12. The cooled water is pumped upwards through the spiral channel 16 and the system is closed at the inlet of the tube 21 at the upper end of zone 12.

The second system receives heat from the heat exchanger or the heat pump 25, and the heated water is supplied to the lower end of the zone 10 by the tube 27, the water is forced upwards through the spiral channel 16 and is received in the tube 28 adjacent the upper end of zone 10. The system is closed over the distribution valve 29, the pump 30 and the distribution valve 31 the outlet of which is connected to the heat exchanger or the heat pump 25.

In the above described way heat can be transferred from one zone to another zone of one and the same heat accumulating system.

Figure 3:
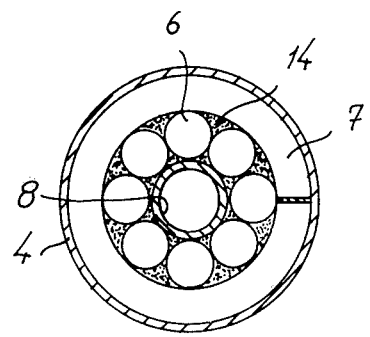
FIG. 3 is a cross section along line III—III through the adapter element of FIG. 2, and FIG. 4 correspondingly shows an alternative embodiment of an adapter element according to the invention.

In the corresponding way heat which may have been received by the asphalt or concrete body can be transferred to any wanted zone of the heat accumulating system. In FIG. 6 the distribution valves are illustrated only diagramatically, whereby the center of the valves is the receiving valve cone which can be rotated to eight different positions corresponding to the eight different tubes 6 (compare FIGS. 2 and 3) or channels 17 (compare FIG. 4) which are represented by the radially outwards extending lines. FIG. 7 shows an example of such valve. It is, however, to be understood that the valve can be formed in many different ways and that there is a possibility of connecting several different tubes 6 or channels 17 at the same time from one and the same valve system.

At certain conditions it may happen that the ground underneath the landing strip 1 is strongly heated, and in such case it may be preferably to collect heat both through the conduits 2 in the strip 1 and through the uppermost of the four heat channels 3 (as seen in FIG. 5) and to transfer such heat to lower parts of the ground or rock.

Preferably the openings 9 of the tubes 6 and the sealing partition wall is formed so that cross zones are obtained in which the intermediate zone is the hottest one and in which successively cooler zones are obtained at each side of the intermediate zone. In this way the temperature gradients between the different zones are reduced and there are no unnecessary heat losses.

In the apparatus illustrated in FIG. 2 the central core tube 8 is used as a self-circulating tube concurrently with the remaining tubes 6.

As previously mentioned the heat transport medium is provided reversible, so that heat may either be received from the strip or the body 1 and be stored in the ground or oppositely may be received from the ground and be transmitted to the strip or body 1.

In the most simple embodiment the heat storing element may be designed as illustrated in FIG. 8 having only two channels 17 formed within a circular-tube and divided by a partition wall 32. As described above the tube contains a spiral strip 7 and for providing flows on different levels there are several openings provided along the two channels 17. The openings are covered by valve means which are most clearly illustrated in FIGS. 9-11. The valve means comprises two valve flaps 34 mounted on a hinge 35 on each side of the wall of the channel 17 and biassed towards closed position by a common spring 36. Between the valve flaps 34 there is a rubber bellow, a magnetic apparatus or similar means 37 which upon actuation expands and presses the valve flaps 34 apart from each other and from the wall of the channel 17 thereby opening a passage way from the spiral channel 16 into the inner channel 17. The rubber bellow 37 or similar means is actuated by a hose or a conduit 38 connected to a control unit like the control unit 19. FIG. 10 shows the valve in its open position.

In FIG. 11 a modified embodiment of the invention is shown, in which the spring 36' is adapted to open the valve flaps 34, whereas two rubber bellows or similar means 37' upon actuation close the valve flaps.

Since the valve has two valve flaps the liquid pressure forces the flaps to the channel wall into sealing engagement independently of from which side of the wall of the channel 17 the pressure is applied. By utilizing the illustrated valves or other corresponding valves placed along the inner tube it is possible to control the flow of liquid in the adaptor element by means of compressed air or in electric way.

It is also possible to provide the valves in the cross partition walls 13 thereby making it possible to provide a flow of liquid past the said partition walls, for instance in case of providing a wanted self-circulation in the entire element.

It should be observed that the zone shielding in the form of cross partition walls 13 is not always necessary. If liquid is circulated between two openings of the inner tubes the liquid above and the liquid underneath the area of the spiral channel between the said two openings do not take part in the flow even if there are no zone shieldings. Of course it is thereby presupposed that the spiral channel 16 is not so wide that there is a self-circulation in the channel. In the embodiment illustrated in FIGS. 8-11 it is possible to provide a distribution of heat between different zones in a simple way by opening valves at two different levels thereby controlling the temperature in the areas as wanted.

It is obvious to the expert that valves of the type illustrated in FIGS. 9-11 may also be used for tubes having a large number of channels 17 rather than the open bores as shown for instance in FIG. 2.

It is to be understood that the above specification and the embodiments of the invention illustrated in the drawings are only illuminating examples and that all kinds of different modifications may be presented within the scope of the appended claims.

I claim:

1. A method for controlling the temperature of a pre-existing, ground-supported asphalt or concrete body and for storing heat in the ground, said body containing a plurality of conduits, wherein said method comprises drilling a plurality of heat channels into the ground at an oblique angle extending under said body to thereby permit formation of said channels beneath an existing body, and to a depth where said channels extend beneath the entire width of said body, said body providing an isolating medium in the direction upwards for the energy stored in the ground, and circulating a liquid heat transport medium between said heat channels and said conduits.

2. The method according to claim 1, wherein said heat channels are divided into a plurality of lengthwise zones and wherein an adapter element is introduced to said heat channels, said adapter element comprising a plurality of inner tubes through which said heat transport medium is circulated, at least two of said inner tubes opening in opposite ends of each of said zones to permit circulation of said medium from said tubes to said channel and back into said tubes, each of said zones being defined by an upper and a lower sealing cross partition wall to thereby permit selective heating of a zone in said channel.

3. The method according to claim 2, wherein said plurality of said channels are drilled parallel to each other, and wherein said channels are connected to a control means, said control means selectively directing said heat to or away from said drilled channels.

4. The method according to claim 2, wherein said inner tubes are wrappingly engaged by a spiral band, said band further engaging the inner wall of said channel, said band sealingly engaging said tubes and said inner channel wall to thereby create a spiral channel, said inner tubes having radially outwardly directed openings, at least two of said inner tubes opening in opposite ends of each of said zones to permit circulation of said medium from said tubes to said channel and back into said tubes, each of side zones being defined by an upper and a lower sealing cross partition wall to thereby permit selective heating of a zone in said channel upon circulation of said transport medium along said spiral channel; and said adapters further comprising a temperature sensor in each of said zones and for indicating at a common central unit the temperature of said zones.

5. The method according to claim 4, wherein said heat transport medium is selectively circulated within said zones so as to provide the highest temperature to said body along its central portion.

6. The method according to claim 1, wherein said plurality of said channels are drilled parallel to each other, and wherein said channels are connected to a control means, said control means selectively directing said heat to or away from said drilled channels.

7. A mechanism for controlling the temperature of a ground-supported asphalt or concrete body, comprising: a plurality of heat channels, said heat channels being drilled into the ground at an oblique angle extending under said body and to thereby permit formation of said channels beneath an existing body, said channels being of sufficient length so as to substantially cover the surface vertially beneath said body; said body providing an isolating medium in the direction upwards for the energy stored in the ground, a plurality of first conduits within said body; a liquid heat transport medium for circulation in the liquid state only and within said channels and said first conduits; pumping means connecting said channels and said first conduits and for circulating said liquid heat transport medium therethrough.

8. The mechanism according to claim 7, wherein said channels are divided into a plurality of lengthwise zone and wherein an adapter element is introduced to said heat channels, said adapter element comprising a plurality of inner tubes through which said heat transport medium is circulated, at least two of said inner tubes opening in opposite ends of each of said zones to permit circulation of said medium from said tubes to said channel and back into said tubes, each of said zones being defined by an upper and a lower sealing cross partition wall to thereby permit selective heating of a zone in said channel.

9. The mechanism according to claim 8, further comprising a spiral band surrounding said tubes and contacting the inner wall of said channel, said spiral band sealingly engaging said tubes and said inner channel wall to thereby create a spiral channel in each of said zones for circulation of said heat transport medium through said zone.

10. The mechanism according to claim 7, further comprising a spiral band surrounding said tubes and contacting the inner wall of said channel, said spiral band sealingly engaging said tubes and said inner channel wall to thereby create a spiral channel in each of said zones for circulation of said heat transport medium through said zone.

11. A mechanism for controlling the temperature of a ground-supported asphalt or concrete body, comprising a plurality of heat channels, said heat channels being drilled into the ground at an oblique angle with said body and to thereby permit formation of said channels beneath an existing body, said channels being of sufficient length so as to substantially cover the surface vertically beneath said body and being divided into a plurality of lengthwise zones; a plurality of first conduits within said body; a liquid heat transport medium for circulation in the liquid state only and within said channels and said conduits, pumping means connecting said channels and first conduits and for circulating said liquid heat transport medium therethrough; an adapter element within said heat channels, said adapter element comprising a plurality of inner tubes through which said heat transport medium is circulated, at least two of said inner tubes opening in opposite ends of each of said zones to permit circulation of said medium from said tubes to said channel and back into said tubes, each of said zones being defined by an upper and a lower sealing cross partition wall to thereby permit selective heating of a zone in said channel; a spiral band surrounding said tubes and contacting the inner wall of said channel, said spiral band sealingly engaging said tubes and said inner channel wall to thereby create a spiral channel in each of said zones for circulation of said heat transport medium through said zones; and said adapters further comprising a temperature sensor in each of said zones for indicating the temperature of said zone at a common central unit.

* * * * *